United States Patent
Kiyosawa (10) Patent No.: US 11,931,889 B2
(45) Date of Patent: Mar. 19, 2024

(54) CONTROL METHOD FOR REGENERATIVE BRAKE AND ROBOT SYSTEM

(71) Applicant: Seiko Epson Corporation, Tokyo (JP)

(72) Inventor: Yuki Kiyosawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 265 days.

(21) Appl. No.: 17/560,833

(22) Filed: Dec. 23, 2021

(65) Prior Publication Data

US 2022/0203561 A1 Jun. 30, 2022

(30) Foreign Application Priority Data

Dec. 25, 2020 (JP) ................................ 2020-216424

(51) Int. Cl.
| | | |
|---|---|---|
| H02P 7/00 | (2016.01) | |
| B25J 9/12 | (2006.01) | |
| B25J 9/16 | (2006.01) | |
| B25J 19/00 | (2006.01) | |

(52) U.S. Cl.
CPC ........... *B25J 19/0004* (2013.01); *B25J 9/126* (2013.01); *B25J 9/1651* (2013.01); *B25J 19/0029* (2013.01); *B25J 19/005* (2013.01)

(58) Field of Classification Search
CPC ........... B25J 9/1651; B25J 19/005; H02P 3/22
See application file for complete search history.

(56) References Cited

U.S. PATENT DOCUMENTS

| | | | |
|---|---|---|---|
| 2012/0180391 A1* | 7/2012 | McKee | E05F 15/73 318/446 |
| 2018/0272845 A1* | 9/2018 | Takenaka | E05F 15/41 |
| 2020/0094410 A1* | 3/2020 | Sato | B25J 9/1674 |
| 2021/0237261 A1* | 8/2021 | Kinoshita | B25J 9/1651 |

FOREIGN PATENT DOCUMENTS

| | | |
|---|---|---|
| JP | 2012-061562 A | 3/2012 |
| JP | 2017-024137 A | 2/2017 |

* cited by examiner

*Primary Examiner* — Muhammad S Islam
(74) *Attorney, Agent, or Firm* — Harness, Dickey & Pierce, P.L.C.

(57) ABSTRACT

A robot system includes one or more combinations of a driving section configured to receive supply of electric power and generate a rotation output of an output shaft and receive supply of a rotating force to the output shaft and generate electric power, a movable section moved by the rotation output, a detecting section configured to detect an angular position of the output shaft, resistor equipment coupled to the driving section, and a switch that can turn on and off coupling of the resistor equipment and the driving section and a control section configured to control the robot system. The control section can execute first braking control targeting the driving section to which the electric power is not supplied, the first braking control calculating speed of the rotation output of the driving section based on an output of the detecting section and causing the switch to turn on and off the coupling of the resistor equipment and the driving section at timing determined in a time-series manner according to target deceleration of the driving section and the speed of the rotation output.

8 Claims, 10 Drawing Sheets

CONTROL METHOD FOR REGENERATIVE BRAKE AND ROBOT SYSTEM

The present application is based on, and claims priority from JP Application Serial Number 2020-216424, filed Dec. 25, 2020, the disclosure of which is hereby incorporated by reference herein in its entirety.

BACKGROUND

1. Technical Field

The present disclosure relates to a control method for a regenerative brake and a robot system.

2. Related Art

There has been a technique for performing, in a robot, in addition to mechanical braking by an electromagnetic brake, regenerative braking by a motor that drives the robot. A braking force obtained by causing the motor to function as a generator is determined according to rotating speed of the motor at that time. In the technique disclosed in JP-A-2017-24137 (Patent Literature 1), regenerative braking and service power-off are executed at timing when a speed command indicates zero in an emergency stop operation. It is possible to reduce an overrun amount from a target position by performing such control.

However, Patent Literature 1 does not refer to a method of controlling the braking force of the regenerative braking when a servomotor is operating at normal rotating speed.

SUMMARY

According to an aspect of the present disclosure, a robot system is provided. The robot system includes: one or more combinations of: a driving section configured to receive supply of electric power and generate a rotation output of an output shaft and receive supply of a rotating force to the output shaft and generate electric power; a movable section moved by the rotation output; a detecting section configured to detect an angular position of the output shaft; resistor equipment having electric resistance and coupled to the driving section; and a switch configured to turn on and off coupling of the resistor equipment and the driving section; and a control section configured to control the robot system. The control section executes first braking control targeting the driving section to which the electric power is not supplied, the first braking control calculating speed of the rotation output of the driving section based on an output of the detecting section and causing the switch to turn on and off the coupling of the resistor equipment and the driving section at timing determined in a time-series manner according to target deceleration determined in advance for the driving section and the speed of the rotation output.

DESCRIPTION OF EXEMPLARY EMBODIMENTS

A. First Embodiment

Figure 1:
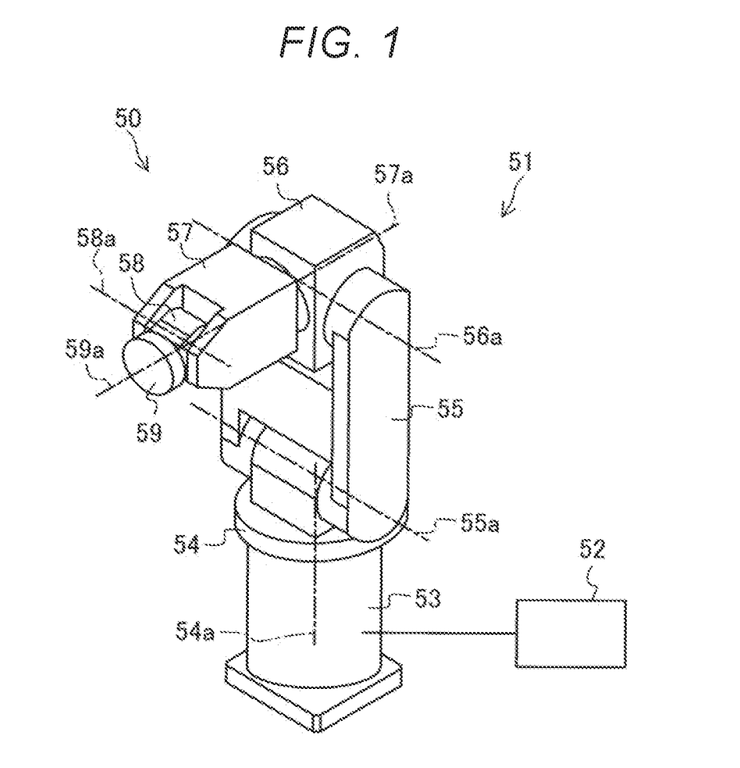
FIG. 1 is an explanatory diagram showing an overall configuration of a robot system according to an embodiment.

FIG. 1 is an explanatory diagram showing an overall configuration of a robot system 50 according to an embodiment. The robot system 50 includes a robot 51 and a control device 52.

The robot 51 is a so-called vertical articulated robot. The robot 51 includes a base 53 and arm elements 54, 55, 56, 57, 58, and 59. Although not shown in FIG. 1, the robot 51 further includes an inverter 83, a resistor 84, and a switch 86.

The base 53 supports the other members configuring the robot 51. The robot 51 is set on a floor by fixing the base 53 to the floor.

The arm element 54 is supported by the base 53 at one end. The arm element 54 is capable of rotating in a predetermined angle range with respect to the base 53 centering on a rotation axis 54a substantially perpendicularly to a setting surface. The other end of the arm element 54 is coupled to the arm element 55. The arm element 55 is coupled to the arm element 54 at one end. The arm element 55 is capable of rotating in a predetermined angle range with respect to the arm element 54 centering on a rotation axis 55a perpendicular to the rotation axis 54a. The other end of the arm element 55 is coupled to the arm element 56. The arm element 56 is coupled to the arm element 55 at one end. The arm element 56 is capable of rotating in a predetermined angle range with respect to the arm element 55 centering on a rotation axis 56a substantially parallel to the rotation axis 55a. The other end of the arm element 56 is coupled to the arm element 57.

The arm element 57 is coupled to the arm element 56 at one end. The arm element 57 is capable of rotating in a predetermined angle range with respect to the arm element 56 centering on a rotation axis 57a perpendicular to the rotation axis 56a. The other end of the arm element 57 is coupled to the arm element 58. The arm element 58 is coupled to the arm element 57 at one end. The arm element 58 is capable of rotating in a predetermined angle range with respect to the arm element 57 centering on a rotation axis 58a perpendicular to the rotation axis 57a. The other end of the arm element 58 is coupled to the arm element 59.

The arm element 59 is coupled to the arm element 58 at one end. The arm element 59 is capable of rotating in a predetermined angle range with respect to the arm element 58 centering on a rotation axis 59a perpendicular to the rotation axis 58a. An end effector is attached to the other end of the arm element 59. The end effector can hold a workpiece, which is a target object of work by the robot 51. A control point of the robot 51 is set in a position on the rotation axis 59a of the arm element 59 at a predetermined distance from the arm element 59. To facilitate understanding of the technique, the end effector is not shown in FIG. 1.

A coupling portion of the arm element 54 and the base 53 configures a torsion joint. A coupling portion of the arm element 55 and the arm element 54 configures a bending joint. A coupling portion of the arm element 56 and the arm element 55 configures a bending joint. A coupling portion of the arm element 57 and the arm element 56 configures a torsion joint. A coupling portion of the arm element 58 and the arm element 57 configures a bending joint. A coupling portion of the arm element 59 and the arm element 58 configures a torsion joint. The rotation axes 58a, 56a, and 55a are parallel to one another.

Motor units 1 are respectively provided in the coupling portions of the arm elements, that is, the joins of the robot 51. The arm elements 54, 55, 56, 57, 58, and 59 are moved by a rotation output of an output shaft 12 of the motor 11 included in the motor unit 1. The arm elements 54, 55, 56, 57, 58, and 59 are moved, whereby a relative angle of two arm elements coupled to each other via the joint changes. As a result, the end effector attached to the arm element 59 is arranged in any position of a three-dimensional space in any posture. The configuration of the motor units 1 is explained below.

The control device 52 controls the robot system 50. The control device 52 is communicably coupled to the robot 51 by a cable. The control device 52 includes a CPU, which is a processor, a RAM, and a ROM. The RAM includes a main memory and an auxiliary storage device. The CPU of the control device 52 loads a computer program stored in the auxiliary storage device to the main memory and executes the computer program to thereby cause the robot 51 to operate.

About control of a control point of the robot 51, the control device 52 can perform PTP control (Point To Point control) and CP control (Continuous Path control). The PTP control is control in which only a target position and a target posture are designated and an operation path to the target position is not designated. The CP control is control in which a position and a posture are controlled along the operation path.

Figure 2:
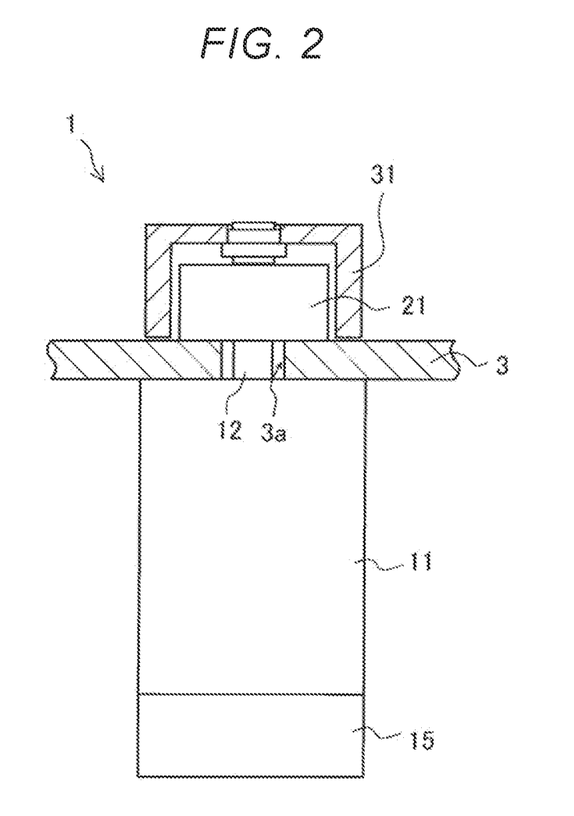
FIG. 2 is an explanatory diagram showing the configuration of a motor unit.

FIG. 2 is an explanatory diagram showing the configuration of the motor unit 1. The motor unit 1 includes a motor 11, an encoder 15, an electromagnetic brake 21, a pulley 31, and a motor plate 3.

The motor plate 3 is a member for fixing the motor unit 1 to the robot 51. The motor 11 and the electromagnetic brake 21 are fixed to the motor plate 3. The motor plate 3 includes a shaft hole 3a.

The motor 11 includes the output shaft 12. The motor 11 receives supply of electric power and generates a rotation output of the output shaft 12. The motor 11 receives supply of a rotating force to the output shaft 12 and generates electric power. The motor 11 is fixed to the motor plate 3. The output shaft 12 pierces through the shaft hole 3a of the motor plate 3.

The pulley 31 is coupled to the output shaft 12 of the motor 11 via a speed reducer. The pulley 31 is rotated by the output shaft 12 of the motor 11. The rotation of the pulley 31 is transmitted to the arm element via a belt and moves the arm element. In a state in which electric power is not supplied to the motor 11 to which the pulley 31 is coupled, a rotating force due to the movement of the arm element is transmitted to the pulley 31. The pulley 31 supplies the rotating force to the output shaft 12. As a result, the motor 11 functions as a generator.

The encoder 15 detects an angular position of the output shaft 12 of the motor 11. The encoder 15 is fixed to the motor 11 on the opposite side of the motor plate 3 with respect to the motor 11.

The electromagnetic brake 21 is fixed to the motor plate 3 on the opposite side of the motor 11 with respect to the motor plate 3. In a state in which electric power is not supplied to the electromagnetic brake 21, the electromagnetic brake 21 un-rotatably holds the output shaft 12 that is standing still. Specifically, the electromagnetic brake 21 presses, with an elastic force by a spring, a movable member against a member coupled to the output shaft 12 to thereby un-rotatably hold the output shaft 12 with a frictional force between the movable member and the member. In a state in which electric power is supplied to the electromagnetic brake 21, the electromagnetic brake 21 enables the output shaft 12 to rotate. Specifically, electric power is supplied to the electromagnetic brake 21, whereby the electromagnetic brake 21 separates the movable member from the member coupled to the output shaft 12 while resisting the elastic force of the spring. As a result, the output shaft 12 is enabled to rotate.

Figure 3:
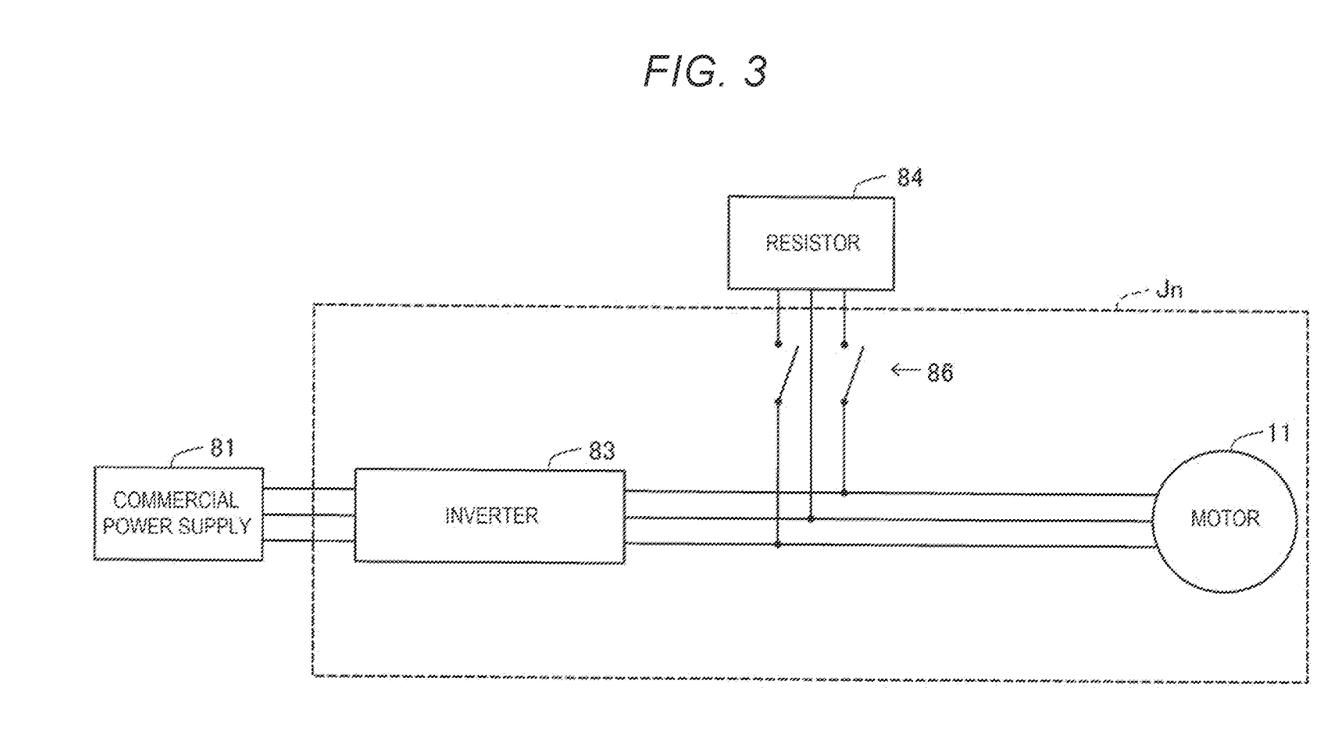
FIG. 3 is a block diagram showing electrical components coupled to a motor.

FIG. 3 is a block diagram showing electrical components coupled to the motor 11. The inverter 83 is coupled to the motor 11 and a commercial power supply 81. The inverter 83 converts a frequency and a voltage of AC power supplied from the commercial power supply 81 and supplies the AC power to the motor 11. In the robot 51, one inverter 83 is provided for one motor 11 that drives one joint.

The resistor 84 has electric resistance. The resistor 84 receives supply of electric power and generates heat. The resistor 84 is coupled to the motor 11 via the switch 86. The switch 86 turns on and off coupling of the resistor 84 and the motor 11.

One combination of the motor 11, the arm element moved by a rotation output of the motor 11, the encoder 15, the electromagnetic brake 21, and the switch 86 is provided to correspond to one joint Jn (see FIGS. 2 and 3). That is, in the robot system 50, six combinations of the motor 11, the arm element moved by a rotation output of the motor 11, the encoder 15, the electromagnetic brake 21, and the switch 86 are provided. In FIG. 3, components corresponding to one joint Jn are surrounded by a broken line and shown.

In the robot system 50, six sets of the motor 11 and the inverter 83 corresponding to six joints Jn are coupled to the commercial power supply 81 in parallel to one another.

In the robot system 50, six sets of the motor 11 and the switch 86 corresponding to the six joints Jn are coupled to the resistor 84 in parallel to one another. That is, six combinations of the motor 11, the arm element, the encoder 15, and the switch 86 corresponding to the six joints Jn share one resistor 84 (see FIGS. 2 and 3). In terms of functions, it can be grasped that one combination of the motor 11, the switch 86, the inverter 83, and the resistor 84 is provided to correspond to one joint Jn.

Figure 4:
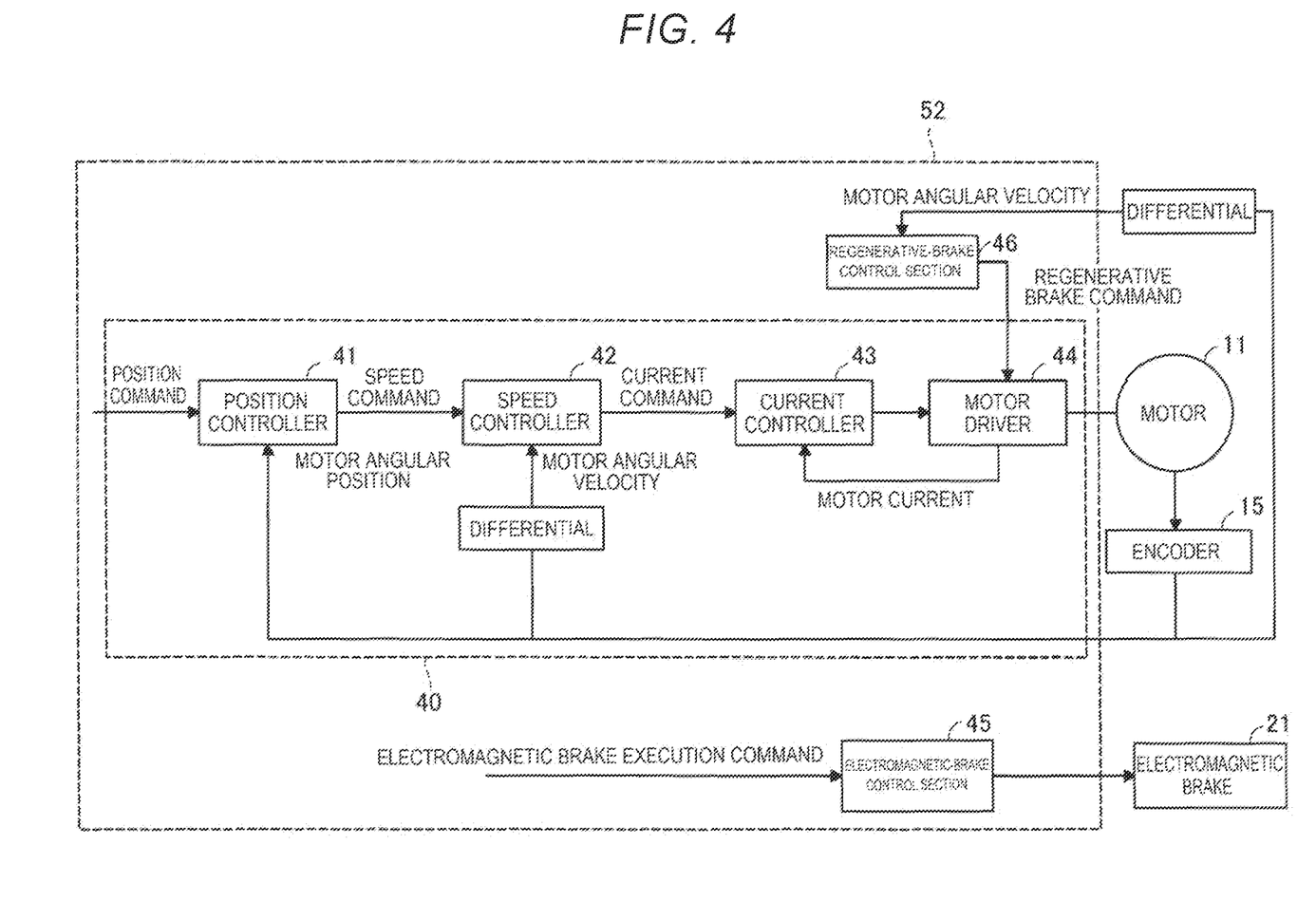
FIG. 4 is a block diagram showing main functional sections of a control device.

FIG. 4 is a block diagram showing main functional sections of the control device 52. The control device 52 includes an operation command section 40, an electromagnetic-brake control section 45, and a regenerative-brake control section 46.

The operation command section 40 receives a position command and controls the operation of the motor 11 according to the position command. The operation command section 40 includes a position controller 41, a speed controller 42, a current controller 43, and a motor driver 44.

The position controller 41 generates a speed command based on a difference between the position command input to the position controller 41 and the angular position of the output shaft 12 input from the encoder 15.

The speed controller 42 calculates target rotating speed of the output shaft 12 according to the speed command input from the position controller 41 and motor angular velocity, which is speed of a rotation output of the motor 11, and generates a current command corresponding to the target rotating speed. The motor angular velocity is calculated based on an output of the encoder 15. More specifically, the motor angular velocity is obtained by differentiating the angular position of the output shaft 12 detected by the encoder 15.

The current controller 43 performs proportional control and integral control for a difference between the current command input from the speed controller 42 and a driving current of the motor 11 input from the motor driver and controls the motor driver 44 such that an electric current corresponding to the current command is supplied to the motor 11.

The motor driver 44 includes the inverter 83 and the switch 86 as constituent elements (see FIG. 3). The motor driver 44 supplies an electric current to the motor 11 and drives the motor 11. In a state in which an electric current is not supplied to the motor 11, the motor driver 44 turns on and off coupling of the resistor 84 to the motor 11.

The electromagnetic-brake control section 45 actuates the electromagnetic brake 21 according to an electromagnetic brake execution command input from the operation command section 40 (see a lower part of FIG. 4). The output shaft 12 of the motor 11 is un-rotatably held by the electromagnetic brake 21.

The regenerative-brake control section 46 controls, according to the speed command input from the position controller 41 and the motor angular velocity, for the motor 11 that does not receive supply of electric power and receives supply of a rotating force to the output shaft 12, a braking force of a regenerative brake via the motor driver 44 (see an upper right part of FIG. 4).

Figure 5:
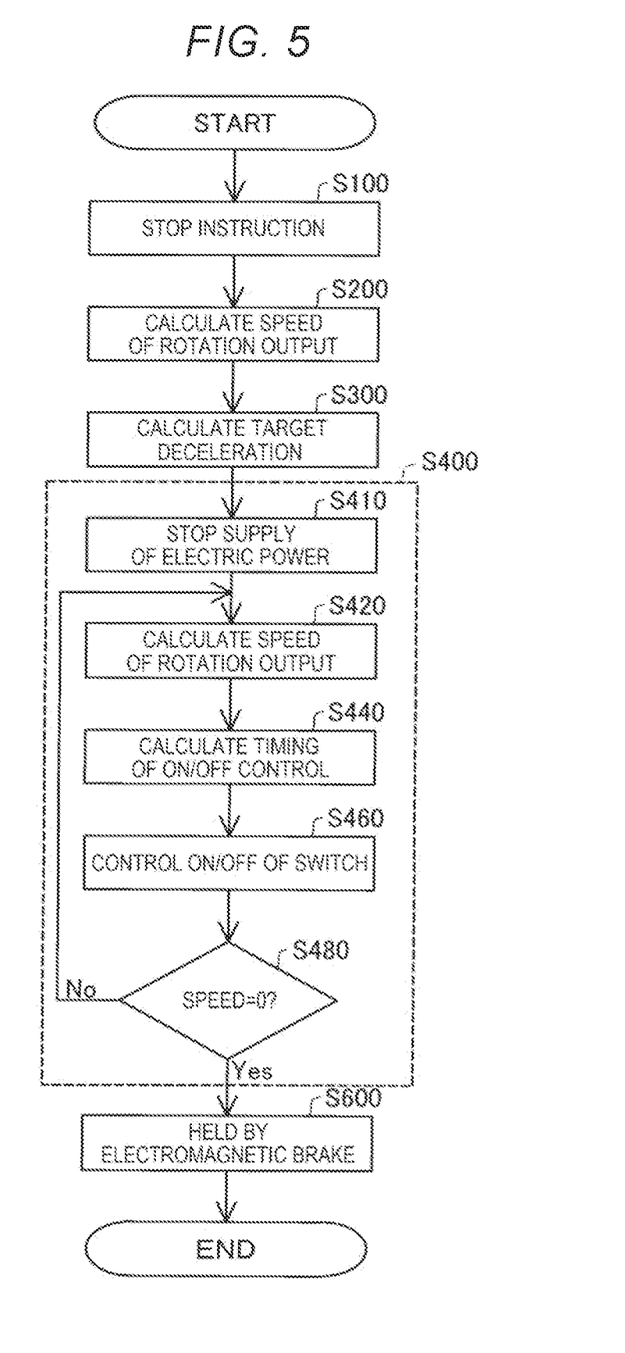
FIG. 5 is a flowchart showing processing of the control device performed when a stop instruction for stopping the operation of a robot is given.

FIG. 5 is a flowchart showing processing of the control device 52 performed when a stop instruction for stopping the operation of the robot 51 is given. A control method for the regenerative brake is realized by the processing shown in FIG. 5. The stop instruction is given by, for example, pressing an emergency stop button.

In step S100, the control device 52 receives the stop instruction.

In step S200, the control device 52 calculates a motor angular velocity, which is speed of a rotation output of the motor 11, based on an output of the encoder 15. The motor angular velocity is obtained by differentiating the angular position of the output shaft 12 detected by the encoder 15.

In step S300, the control device 52 determines, for the motors 11 of the joints, target decelerations, target angular velocities, and target angular positions of the motors 11 such that the motors 11 decelerate from the present motor angular velocities at decelerations for not damaging equipment coupled to the motors 11. The target decelerations are set to, based on the mass of the arms of the robot 51 ahead of the joints, the mass of a workpiece held by the robot 51, the mass of the end effector, and the like, numerical values for not damaging speed reducers and the like coupled to the motors 11. The target angular velocities and the target angular positions are set based on the set target decelerations.

For example, in order to stop the operation of the robot 51 in a state in which a control point is present on an operation path designated in the CP control, the target decelerations, the target angular velocities, and the target angular positions of the motors 11 of the joints are determined such that the control point moves while decelerating along the designated operation path. As a result, the motors 11 of the joints are respectively decelerated at unique decelerations.

In step S400, the control device 52 executes stop processing for stopping the motor 11. More specifically, in step S400, the regenerative brake is executed for the motors 11 of the robot 51.

In step S410, the control device 52 stops the supply of the electric power to the motor 11.

In steps S420 to S460, the control device 52 causes the switch 86 to turn on and off coupling of the resistor 84 and the motor 11 at timing determined in a time-series manner according to the target deceleration determined for the motor 11 in step S300 and the speed of the rotation output of the motor 11.

In step S420, the control device 52 calculates motor angular velocity, which is speed of the rotation output of the motor 11, based on an output of the encoder 15. The motor angular velocity is obtained by differentiating the angular position of the output shaft 12 detected by the encoder 15.

In step S440, the control device 52 calculates, based on the target deceleration determined in step S300 and the motor angular velocity obtained in step S420, to realize the target deceleration, a time period when the regenerative brake is turned on next and a time period when the regenerative brake is turned off next.

In step S460, the control device 52 causes the switch 86 to turn on and off the coupling of the resistor 84 and the motor 11 at the timing obtained in step S230 (see FIG. 3).

In step S480, the control device 52 determines whether the motor angular velocity falls within a predetermined range including 0. When the motor angular velocity falls within the predetermined range including 0, the processing proceeds to step S600. When the motor angular velocity does not fall within the predetermined range including 0, the processing returns to step S420. As a result, ON and OFF of the regenerative brake are repeated until the motor angular velocity decreases to near 0.

Figure 6:
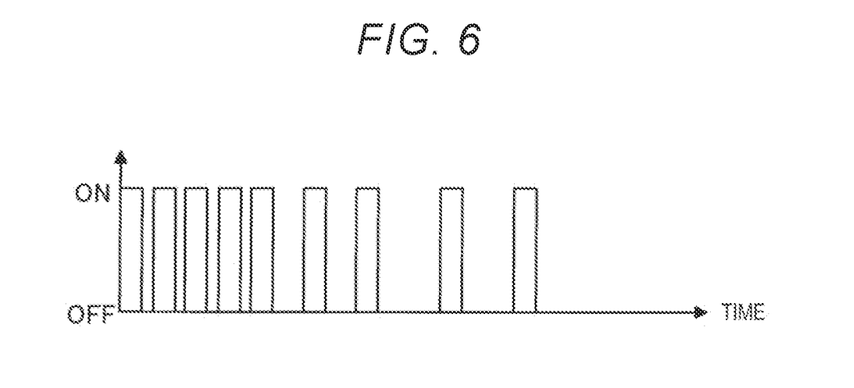
FIG. 6 is a graph showing time periods when the control device turns on a regenerative brake and time periods when the control device turns off the regenerative brake.

FIG. 6 is a graph showing time periods when the control device 52 turns on the regenerative brake and time periods when the control device 52 turns off the regenerative brake. In an example shown in FIG. 6, it is seen that a ratio of the time periods when the regenerative brake is turned on per unit time is set large in the beginning and, thereafter, the ratio of the time period when the regenerative brake is turned on per unit time decreases. Under the premise that the motor angular velocity is fixed, when a high braking force is exerted, the ratio of the time periods when the regenerative brake is turned on per unit time is set large. When a low braking force is exerted, the ratio of the time periods when the regenerative brake is turned on per unit time is set small.

Figure 7:
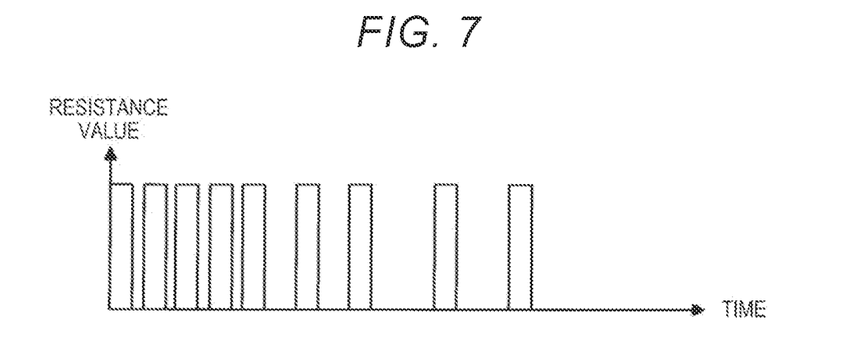
FIG. 7 is a graph showing the magnitude of electric resistance coupled to the motor at the time when ON and OFF of the regenerative brake are repeated according to FIG. 6.

FIG. 7 is a graph showing the magnitude of electric resistance coupled to the motor 11 at the time when ON and OFF of the regenerative brake are repeated according to FIG. 6. Electric resistance of the resistor 84 is fixed (see FIG. 3). Therefore, the graph of FIG. 7 is a similar figure of the graph of FIG. 6.

Figure 8:
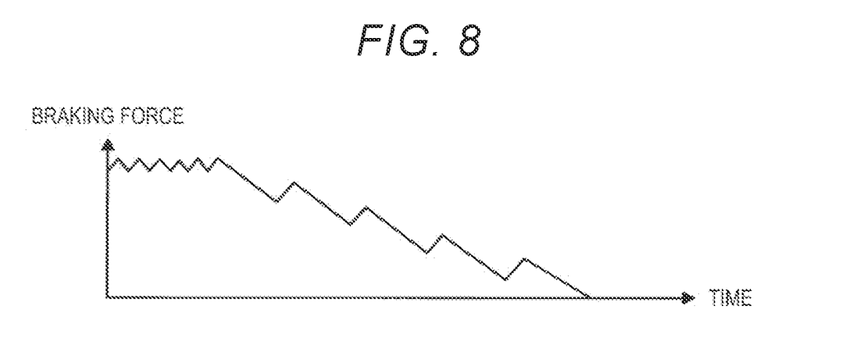
FIG. 8 is a graph showing the magnitude of a braking force by the motor at the time when ON and OFF of the regenerative brake are repeated according to FIG. 6.

FIG. 8 is a graph showing the magnitude of a braking force by the motor 11 at the time when ON and OFF of the regenerative brake are repeated according to FIG. 6. The braking force at the time when the regenerative brake is ON is smaller as the motor angular velocity is lower. Time delays occur in a period from when the resistor 84 is coupled to the motor 11 until when the braking force is generated and in a period from when the coupling of the motor 11 and the resistor 84 is interrupted until when the braking force is completely lost. As a result, the magnitude of the braking force by the motor 11 at the time when ON and OFF of the regenerative brake are repeated according to FIG. 6 is as shown in FIG. 8. In an example shown in FIG. 8, it is seen that the braking force is large in the beginning and, thereafter, the braking force decreases. It is possible to smoothly stop the motor 11 by controlling the braking force in this way.

By performing the processing in steps S420 to S460 in FIG. 5, it is possible to decelerate the arm elements 54, 55, 56, 57, 58, and 59 according to the target deceleration with the regenerative braking. As a result, it is possible to prevent a situation in which equipment such as the speed reducer coupled to the motor 11 is damaged by the regenerative braking. With the configuration in this embodiment, compared with a form of performing current control to control the braking force of the regenerative brake, it is possible to control the braking force of the regenerative brake with a simpler configuration.

Figure 9:
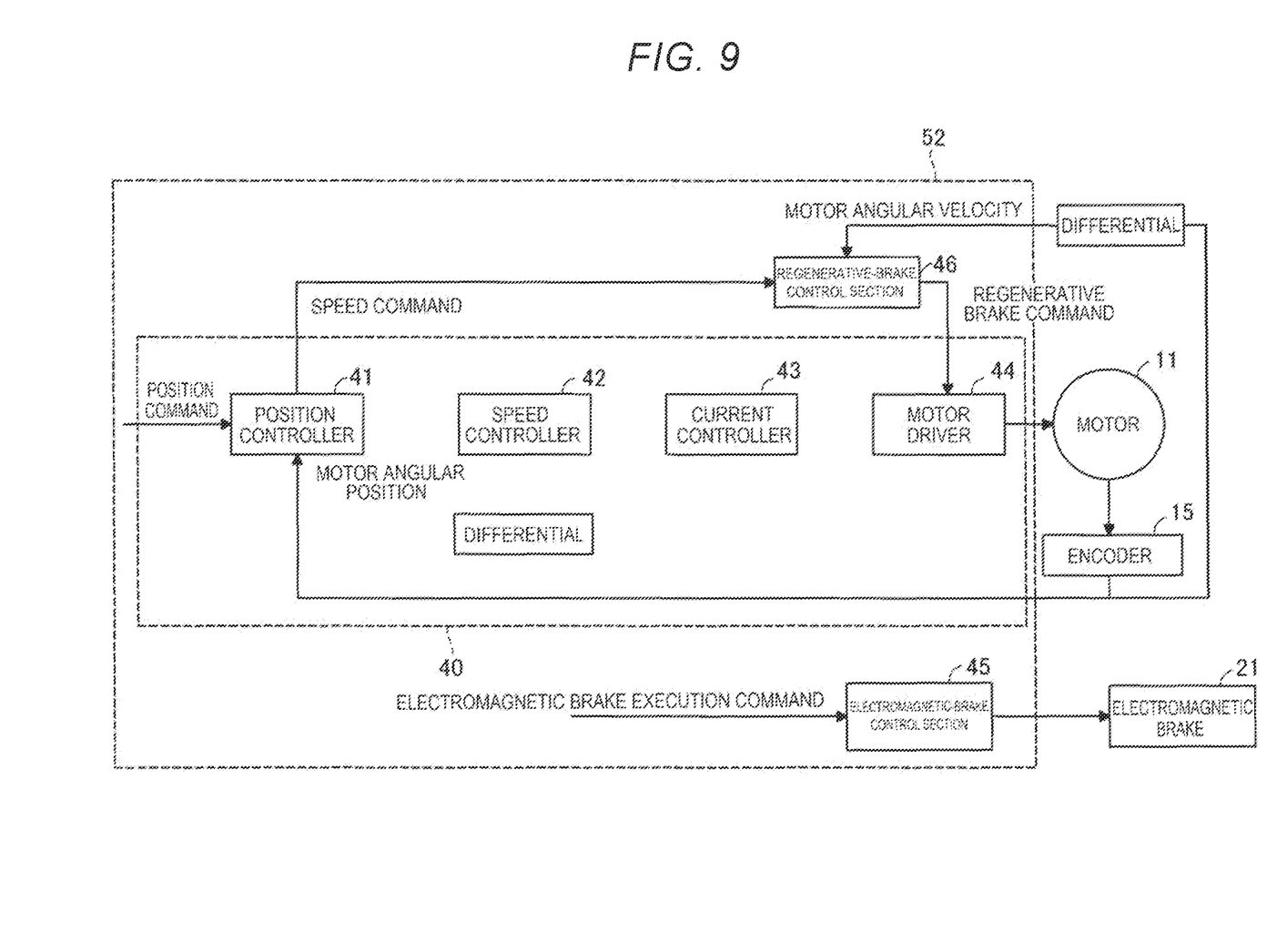
FIG. 9 is a block diagram showing a relation among the main functional sections of the control device in step S460.

FIG. 9 is a block diagram showing a relation among the main functional sections of the control device 52 in step S460. Specifically, the processing in steps S420 to S460 in FIG. 5 is performed as explained below in the control device 52. The control device 52 generates a position command according to the target angular position calculated in step S300 in FIG. 5. The position controller 41 generates a speed command based on a difference between the input position command and the angular position of the output shaft 12 input from the encoder 15 and inputs the speed command to the regenerative-brake control section 46.

The regenerative-brake control section 46 calculates, according to the speed command input from the position controller 41 and the motor angular velocity, a time period when the regenerative brake is turned on next and a time period when the regenerative brake is turned off next. The regenerative-brake control section 46 controls the motor driver 44 according to a result of the calculation. The motor driver 44 turns on and off the switch 86 according to an instruction from the regenerative-brake control section 46 (see FIG. 3).

In step S410 in FIG. 5, the supply of the electric power to the motor 11 is stopped. Therefore, in the processing in steps S420 to S460 in FIG. 5, the regenerative-brake control section 46 does not perform the control of the electric current supplied to the motor 11. In the processing in steps S420 to S460 in FIG. 5, the speed controller 42 and the current controller 43 do not function.

In step S600 in FIG. 5, the electromagnetic-brake control section 45 actuates the electromagnetic brake 21 (see a lower part of FIG. 9). As a result, the output shaft 12 of the motor 11 is un-rotatably held by the electromagnetic brake 21.

The motor 11 in the first embodiment is referred to as "driving section" as well. The arm elements 54, 55 56, 57, 58, and 59 are referred to as "movable sections" as well. The encoder 15 is referred to as "detecting section" as well. The resistor 84 is referred to as "resistor equipment" as well. The control device 52 is referred to as "control section" as well. The processing in step S400 performed for the motor 11 to which electric power is not supplied is referred to as "first braking control" as well.

B. Second Embodiment

A robot system 50b in a second embodiment includes a secondary battery 84b instead of the resistor 84 as resistor equipment. The robot system 50b in the second embodiment includes a second converter 85. Further, in the robot system 50b in the second embodiment, processing of the control device 52 in stopping the robot 51 is different from the processing in the robot system 50 in the first embodiment. Otherwise, the robot system 50b in the second embodiment is the same as the robot system 50 in the first embodiment.

Figure 10:
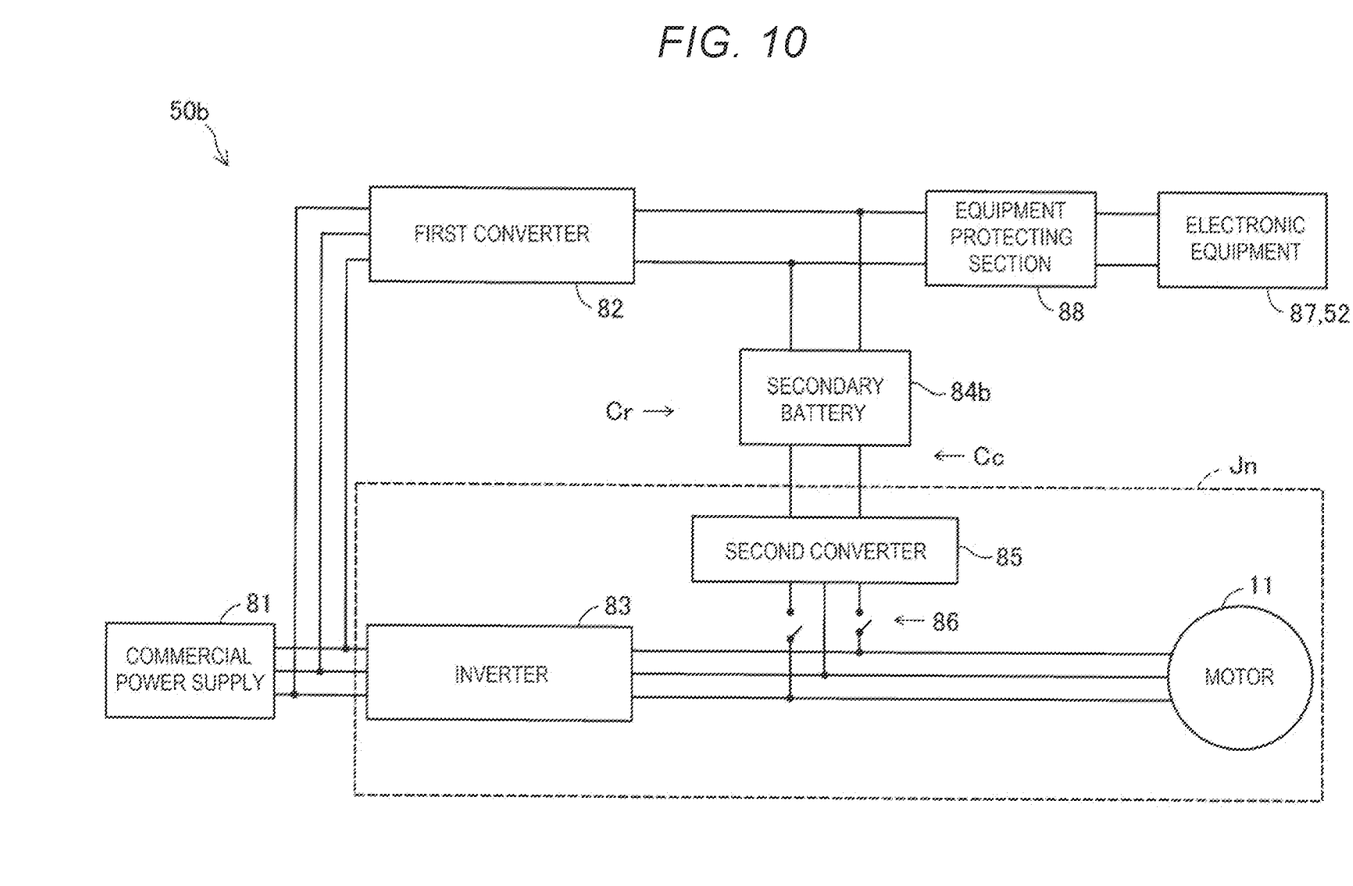
FIG. 10 is a block diagram showing electrical components coupled to the motor in a robot system in a second embodiment.

FIG. 10 is a block diagram showing electrical components coupled to the motor 11 in the robot system 50b in the second embodiment. The robot system 50b in the second embodiment includes a first converter 82, electronic equipment 87, an equipment protecting section 88, a secondary battery 84b, and a second converter 85.

The electronic equipment 87 is a component included in the robot system 50b and is equipment that receives supply of DC power and operates. The electronic equipment 87 includes the control device 52 (see FIG. 1).

The first converter 82 is coupled to the commercial power supply 81 and the equipment protecting section 88. The first converter 82 converts AC power supplied from the commercial power supply 81 into DC power and supplies the DC power to the electronic equipment 87 through the equipment protecting section 88.

The secondary battery 84b is coupled to the equipment protecting section 88 in parallel to the first converter 82. The secondary battery 84b is coupled to the second converter 85. The secondary battery 84b stores, via the second converter 85, electric power generated by the motor 11. The secondary battery 84b supplies electric power to the electronic equipment 87 via the equipment protecting section 88. The secondary battery 84b is specifically a lithium ion battery.

The second converter 85 is coupled to the secondary battery 84b. The motor 11 and the inverter 83 are coupled to the second converter 85 in parallel via the switch 86. The second converter 85 converts the AC power generated by the motor 11 into DC power and supplies the DC power to the secondary battery 84b.

A circuit that supplies electric power generated by the motor 11 to the electronic equipment 87 is referred to as regenerative power circuit Cr. In the regenerative power circuit Cr, the switch 86, the second converter 85, the secondary battery 84b, and the equipment protecting section 88 are provided.

The equipment protecting section 88 is coupled to the electronic equipment 87. The first converter 82 and the secondary battery 84b are coupled to the equipment protecting section 88 in parallel. The equipment protecting section 88 controls a voltage of electric power supplied from the first converter 82 or the secondary battery 84b to the electronic equipment 87 to a predetermined value or less. The equipment protecting section 88 is specifically a poly-switch.

By adopting such a configuration, it is possible to utilize, via the secondary battery 84b, electric power generated by the motor 11 without the electronic equipment 87 being damaged by overvoltage.

Although not explained in the first embodiment, the first converter 82, the equipment protecting section 88, and the electronic equipment 87 are provided in the robot system 50 in the first embodiment as well.

One combination of the motor 11, the arm element moved by a rotation output of the motor 11, the encoder 15, the electromagnetic brake 21, the switch 86, the second converter 85, and the inverter 83 is provided to correspond to one joint Jn (see FIGS. 2 and 10). That is, in the robot system 50b, six combinations of the motor 11, the arm element moved by a rotation output of the motor 11, the encoder 15, the electromagnetic brake 21, the switch 86, the second converter 85, and the inverter 83 are provided. In FIG. 10, components corresponding to one joint Jn are surrounded by a broken line and shown.

In the robot system 50b, six sets of the motor 11, the switch 86, and the second converter 85 corresponding to six joints Jn are coupled to the secondary battery 84b in parallel to one another. That is, six combinations of the motor 11, the arm element, the encoder 15, the switch 86, and the second converter 85 corresponding to the six joints Jn share one secondary battery 84b (see FIGS. 2 and 10). That is, the robot system 50b includes a coupling circuit Cc that couples the sixth motors 11 to one another via the secondary battery 84b. In terms of functions, it can be grasped that one combination of the motor 11, the switch 86, the inverter 83, the second converter 85, and the secondary battery 84b is provided to correspond to one joint Jn.

The control device 52 functioning as the electronic equipment 87 can receive the supply of the electric power from the secondary battery 84b and operate, for example, even when the supply of the electric power to the motor 11 is interrupted because of service interruption (see an upper right part of FIG. 10). By adopting such a configuration, even after the motor 11 becomes unable to operate, the control device 52 can execute the first braking control using electric energy stored in the secondary battery 84b (see S400 in FIGS. 5 and S400 in FIG. 11). Therefore, the motor 11 generating a rotation output is appropriately stopped by the control device 52 without damaging the equipment coupled to the motor 11 such as the speed reducer.

Figure 11:
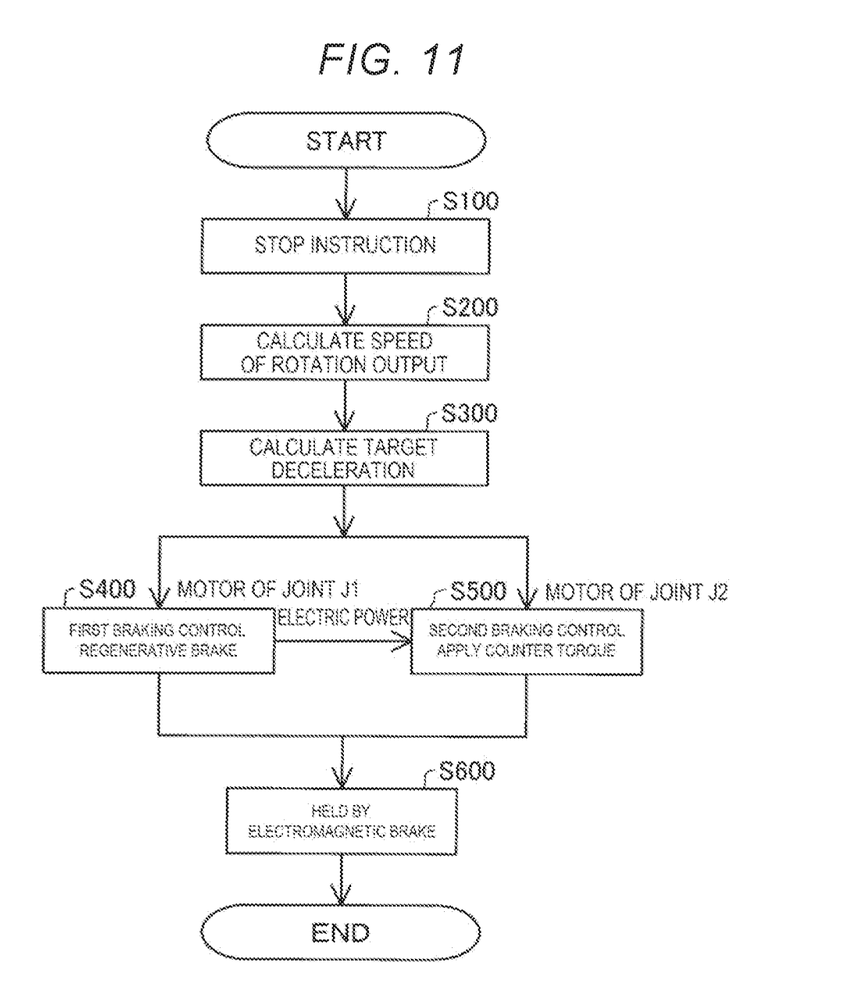
FIG. 11 is a flowchart showing processing of the control device in stopping the operation of the robot in the second embodiment.

FIG. 11 is a flowchart showing processing of the control device 52 at the time when the operation of the robot 51 is stopped in the second embodiment. The processing shown in FIG. 11 is executed in the following cases. (i) Electric power is supplied to the robot system 50b from the commercial power supply 81. (ii) Electric power is not supplied to the robot system 50b from the commercial power supply 81 but electric energy enough for supplying driving power to the motors 11 of the joints until the motors 11 of the joints are stopped is stored in the secondary battery 84b. Processing performed when electric power is not supplied to the robot system 50b from the commercial power supply 81 and electric energy enough for supplying driving power to the motors 11 of the joints until the motors 11 of the joints are stopped is not stored in the secondary battery 84b is explained below.

Processing in steps S100 to S300 in FIG. 11 is the same as the processing in steps S100 to S300 in FIG. 5.

In the second embodiment, the first braking control (see S400 in FIGS. 5 and S400 in FIG. 11) can be executed for a combination corresponding a part of the joints among the six combinations of the motor 11, the arm element moved by a rotation output of the motor 11, the encoder 15, the electromagnetic brake 21, and the switch 86 corresponding to the six joints. Second braking control (see S500 in FIG. 11) can be executed for a combination corresponding to another part of the joints.

Specifically, for the motor 11 of the joint in which the absolute value of the target deceleration obtained in step S300 is closer to 0 than a threshold, processing in step S400 is executed after the processing in step S300. For the motor 11 of the joint in which the absolute value of the target deceleration is equal to or larger than the threshold, processing in step S500 is executed after the processing in step S300. One or more joints in which the absolute values of the target decelerations are closer to 0 than the threshold are collectively referred to as "joint J1". One or more joints in which the absolute values of the target decelerations are equal to or larger than the threshold are collectively referred to as "joint J2". The threshold of the target deceleration can be set to an upper limit of deceleration that can be realized by the regenerative brake or a value obtained by multiplying the upper limit by a coefficient smaller than 1.

The processing in step S400 in FIG. 11 is the same as the processing in step S400 in FIG. 5. However, electric power by regeneration of the motor 11 obtained as a result of the processing in step S400 is supplied to, through the secondary battery 84b, the motor 11 in which the processing in step S500 is executed.

In step S500, the regenerative-brake control section 46 does not stop the supply of the electric power for the motor 11 of the joint J2 set as a target (see S410 in FIG. 5). The supply of the electric power to the motor 11 set as the target is performed from the commercial power supply 81 or the secondary battery 84b (see a lower left part and a middle center part of FIG. 10). Regenerative power is supplied to the secondary battery 84b from the motor 11 of the joint J1. As a result, the second braking control can be performed through the coupling circuit Cc using the electric power generated in the first braking control.

The regenerative-brake control section 46 controls the motor 11 to generate a rotating force having magnitude corresponding to the target deceleration determined in step S300 for the motor 11 of the joint J2 and in the opposite direction of a rotation output up to that point. The rotating force in the opposite direction is determined in a time-series manner to realize the target deceleration determined in step S100. Processing in the control device 52 is the same as the processing explained with reference to FIG. 4 in the first embodiment. In step S500, when the motor angular velocity decreases to 0, the processing proceeds to step S600.

The processing in step S500 performed for the motor 11 to which the electric power is supplied is referred to as "second braking control" as well.

By performing such processing, it is possible to respectively appropriately control the motors 11 of the six joints according to the first braking control in step S400 and the second braking control in step S500 and appropriately decelerate the arm elements 54, 55, 56, 57, 58, and 59 of the robot 51. More specifically, for the joint J2 having large target deceleration, it is possible to generate a rotating force in the opposite direction of a rotation output up to that point and perform deceleration according to the target deceleration. Energy obtained by the first braking control of the motor 11 of the joint J1 can be used for the second braking control of the motor 11 of the other joint J2. Therefore, it is possible to improve energy efficiency of the robot system 50*b*.

Processing in step S600 in FIG. 11 is the same as the processing in step S600 in FIG. 5.

On the other hand, the processing shown in FIG. 11 is not performed when electric power is not supplied to the robot system 50*b* from the commercial power supply 81 and electric energy enough for supplying driving power to the motors 11 of the joints is not stored in the secondary battery 84*b* until the motors 11 of the joints are stopped. In that case, the processing shown in FIG. 5 other than step S410 is performed. The steps in FIG. 5 executed in that case are steps in which, when the supply of the electric power to the motor 11 is interrupted, the control device 52 receives supply of electric power from the secondary battery 84*b* and controls the robot system 50*b*.

Figure 12:
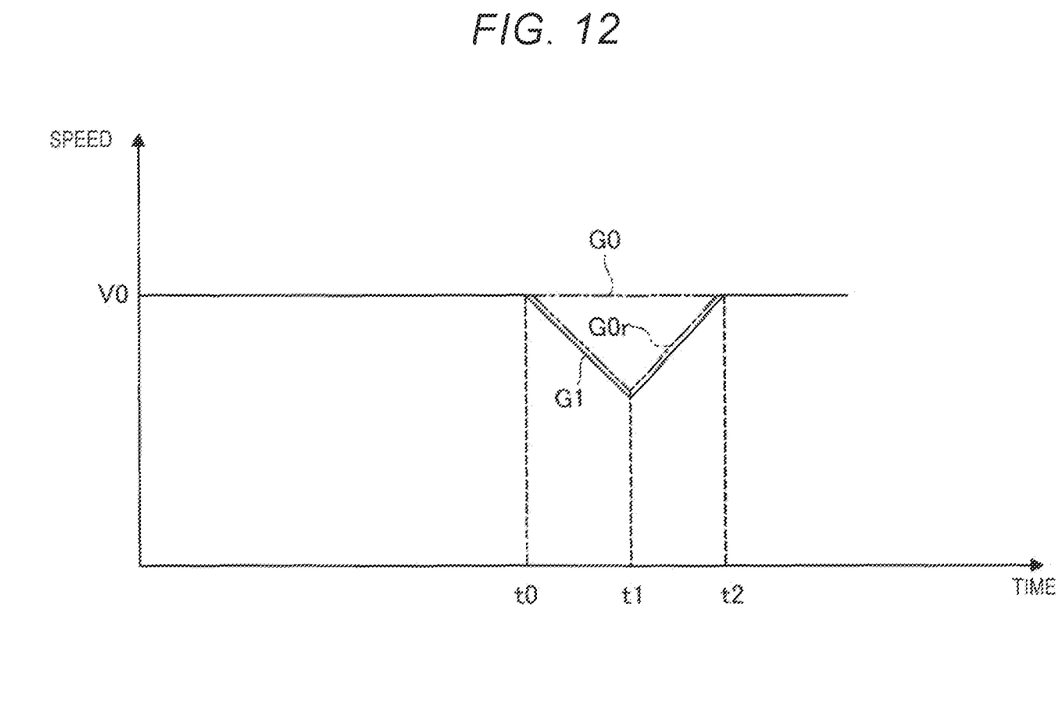
FIG. 12 is a graph showing, in a time-series manner, the magnitude of motor angular velocity of an output shaft at the time when instantaneous service interruption occurs and the magnitude of angular velocity represented by a speed command.

FIG. 12 is a graph showing, in a time-series manner, the magnitude of motor angular velocity of the output shaft 12 at the time when instantaneous service interruption occurs and the magnitude of angular velocity represented by a speed command. In FIG. 12, the horizontal axis indicates time. It is assumed that service interruption occurs at time t0 and supply of electric power is recovered at time t1. An elapsed time from the time t0 to the time t1 is 300 to 400 milliseconds.

In FIG. 12, the magnitude of angular velocity represented by an original speed command is indicated by a graph G0 of an alternate long and short dash line. The magnitude of the angular velocity represented by the original speed command is a fixed value VO. The magnitude of actual motor angular velocity of the output shaft 12 is indicated by a graph G1 of a solid line. The magnitude of angular velocity represented by a speed command after correction is indicated by a graph G0*r* of an alternate long and two short dashes line. The graph G0*r* of the angular velocity represented by the speed command after correction and the graph G1 of the actual motor angular velocity of the output shaft 12 coincide. However, to facilitate understanding of the technique, in FIG. 12, the graph G0*r* and the graph G1 are shifted and shown.

When the PTP control is performed for control of a control point of the robot 51, the control device 52 performs processing explained below if instantaneous service interruption occurs.

If service interruption occurs, the control device functioning as the electronic equipment 87 receives the supply of the electric power from the secondary battery 84*b* and operates as explained above. On the other hand, the motors 11 of the joints lose a driving force because the supply of the electric power is interrupted. As a result, the motor angular velocity G1 of the output shaft 12 decreases from VO after the time to.

For example, when the robot 51 comes into contact with another structure and is inhibited from operating and the motor angular velocity of the output shaft 12 decreases, processing explained below is performed in the robot system 50*b*. That is, when the difference between the motor angular velocity of the output shaft 12 and the angular velocity VO represented by the original speed command is equal to or larger than a threshold, processing of "error stop" is performed and the operation of the robot 51 is stopped. As a result, damage to the robot 51 or the other structure is reduced or prevented. Thereafter, restoration processing is performed.

In this embodiment, when the supply of the electric power from the commercial power supply 81 is interrupted, the control device 52 performs processing explained below instead of the processing explained above. That is, the control device 52 corrects the speed command from content represented by the graph G0 to content represented by the graph G0*r*. That is, the control device 52 matches the content of the speed command from the time t0 to the time 1 with the actual motor angular velocity G1 of the output shaft 12. This processing is performed until the time t1 after the time t0 according to processing of repetition. As a result, in a period from the time t0 to the time t1, the difference between the motor angular velocity of the output shaft 12 and the angular velocity represented by the speed command after correction decreases to 0.

The control device 52 corrects, as explained below, the content of the speed command after the time t1 when the supply of the electric power is recovered. That is, the control device 52 corrects the speed command to increase the angular velocity from the actual motor angular velocity G1 of the output shaft 12 at the time t1 to reach the magnitude VO of the angular velocity represented by the original speed command at the time t2. By performing such processing, the robot 51 can continue the operation without being stopped by the error stop even when instantaneous service interruption occurs.

The secondary battery 84*b* in the second embodiment is referred to as "power storage section" or "resistor equipment" as well.

C. Other Embodiments

C1. Another Embodiment 1

In the first embodiment, the six combinations of the motor 11, the arm element, the encoder 15, and the switch 86 corresponding to the six joints Jn share the one resistor 84 (see FIGS. 2 and 3). In the second embodiment, the six combinations of the motor 11, the arm element, the encoder 15, the switch 86, and the second converter 85 corresponding to the six joints Jn share the one secondary battery 84*b* (see FIGS. 2 and 10). However, one resistor equipment may be provided for each of the combinations. For example, capacitors may be provided as the resistor equipment to correspond to the joints.

In the embodiments, in the robot systems 50 and 50*b*, the six combinations of the motor 11, the arm element, the encoder 15, and the switch 86 corresponding to the joints Jn are provided. However, the combinations may be provided by one or may be provided by another number such as three or four. However, it is preferable to provide a plurality of combinations.

(2) The robot system 50*b* in the second embodiment includes the secondary battery 84*b* instead of the resistor 84 as the resistor equipment (see FIGS. 3 and 10). However, a robot system may include both of a resistor and a storage battery as the resistor equipment. The storage battery may be a nickel hydrogen battery or may be a capacitor.

(3) In the embodiments, the target deceleration of the motor 11 is determined such that the motor 11 decelerates at deceleration for not damaging the equipment coupled to the motor 11 (see S300 in FIG. 5 and S300 in FIG. 11). However, for example, when the technique of the present disclosure is applied to an AMR (Autonomous Mobile Robot), the target deceleration can be set to a value for not toppling the AMR.

(4) The detection of the angular position of the output shaft 12 may be performed by detection of an amount of change of the angular position. A detecting section that can detect an absolute angular position of the output shaft 12 can also be applied to the detection of the angular position.

(5) In the first embodiment, the motor angular velocity is explained as being calculated in steps S200 and S420 in FIG. 5. However, the motor angular velocity may be always acquired.

(6) In the embodiments, the timing when the regenerative brake is turned on and the timing when the regenerative brake is turned off are determined in a time-series manner by the processing of the repetition of steps S420 to S460 (see FIGS. 5 and 6). However, the timing when the regenerative brake is turned on and the timing when the regenerative brake is turned off until the motor angular velocity decreases to 0 can be determined by calculation in advance without being determined by the processing of the repetition. The stop of the supply of the electric power to the motor 11 may be performed not within the first braking control but outside the first braking control (see S410 in FIG. 5).

(7) In the second embodiment, the electronic equipment 87 includes the control device 52 (see FIG. 1). The electronic equipment 87 may include other equipment.

(8) In the second embodiment, the equipment protecting section 88 is specifically the poly-switch. However, the equipment protecting section 88 can be another component such as a DC/DC converter. For example, the equipment protecting section 88 can be configured to, when the voltage of electric power supplied to electronic equipment is equal to or larger than a threshold, couple another circuit including additional resistor equipment to the electronic equipment in series and reduce the voltage applied to the electronic equipment.

(9) In the second embodiment, the first braking control or the second braking control are performed according to the target deceleration (see FIG. 11). However, a target for which the first braking control is performed and a target for which the second braking control is performed may be divided according to other parameters such as angular velocity of a motor.

C2. Another Embodiment 2

In the second embodiment, the robot system 50*b* includes the secondary battery 84*b*. The control device 52 functioning as the electronic equipment 87 can receive the supply of the electric power from the secondary battery 84*b* and operate (see the upper right part of FIG. 10). However, as in the first embodiment, a robot system may not include the secondary battery 84*b* (see FIG. 3).

C3. Another Embodiment 3

In the second embodiment, the first braking control is executed for a part of the joints and the second braking control is executed for another part of the joints (see S400 and S500 in FIG. 11). However, as in the first embodiment, the second braking control may not be executed.

C4. Another Embodiment 4

In the second embodiment, the equipment protecting section 88 is provided in the regenerative power circuit Cr. However, as in the first embodiment, a robot system may not include the regenerative power circuit Cr.

D. Still Other Aspects

The present disclosure is not limited to the embodiments explained above and can be realized in various aspects without departing from the gist of the present disclosure. For example, the present disclosure can also be realized by aspects described below. Technical features in the embodiments corresponding to technical features in the aspects described below can be substituted or combined as appropriate in order to solve a part or all of the problems of the present disclosure or achieve a part or all of the effects of the present disclosure. Unless the technical features are explained as essential technical features in this specification, the technical features can be deleted as appropriate.

(1) According to an aspect of the present disclosure, a robot system is provided. The robot system includes: one or more combinations of: a driving section configured to receive supply of electric power and generate a rotation output of an output shaft and receive supply of a rotating force to the output shaft and generate electric power; a movable section moved by the rotation output; a detecting section configured to detect an angular position of the output shaft; resistor equipment having electric resistance and coupled to the driving section; and a switch configured to turn on and off coupling of the resistor equipment and the driving section; and a control section configured to control the robot system. The control section executes first braking control targeting the driving section to which the electric power is not supplied, the first braking control calculating speed of the rotation output of the driving section based on an output of the detecting section and causing the switch to turn on and off the coupling of the resistor equipment and the driving section at timing determined in a time-series manner according to target deceleration determined in advance for the driving section and the speed of the rotation output.

According to such an aspect, it is possible to decelerate, with the regenerative braking, the movable section according to the target deceleration.

(2) In the robot system according to the aspect, the robot system may include, as at least a part of the resistor equipment, a power storage section configured to store electric power generated by the driving section, and the control section may receive supply of the electric power from the power storage section and operate when the supply of the electric power to the driving section is interrupted.

According to such an aspect, even after the driving section cannot operate, the control section can execute the first braking control using energy stored in the power storage section. Therefore, the driving section is appropriately stopped.

(3) In the robot system according to the aspect, the one or more combinations may be a plurality of the combinations, the robot system may include a coupling circuit configured to couple a plurality of the driving sections included in the plurality of combinations to one another, and the control section may execute the first braking control for the one or more combinations among the plurality of combinations and execute, for another one or more combinations among the plurality of combinations, second braking control targeting the driving section to which the electric power is supplied, the second braking control controlling, with the coupling circuit, the driving section to generate, using the electric power generated by the first braking control, a rotating force having magnitude corresponding to target deceleration determined in advance for the driving section and in an opposite direction of the rotation output.

According to such an aspect, it is possible to respectively appropriately control the plurality of driving sections according to the first braking control and the second braking control and appropriately decelerate a plurality of movable sections of the robot. Since energy obtained by the first braking control of a certain driving section can be used for the second braking control of the other driving sections, it is possible to improve energy efficiency of the robot system.

(4) In the robot system according to the aspect, the robot system may include: a regenerative power circuit configured to supply the electric power generated by the driving section to electronic equipment included in the robot system; and an equipment protecting section provided in the regenerative power circuit and configured to control a voltage of the electric power supplied to the electronic equipment to a predetermined value or less.

According to such an aspect, it is possible to utilize the electric power generated by the driving section without damaging the electronic equipment.

(5) According to another aspect of the present disclosure, a control method for a regenerative brake in a robot system is provided. The robot system includes: one or more combinations of: a driving section configured to receive supply of electric power and generate a rotation output of an output shaft and receive supply of a rotating force to the output shaft and generate electric power; a movable section moved by the rotation output; a detecting section configured to detect an angular position of the output shaft; resistor equipment having electric resistance and coupled to the driving section; and a switch configured to turn on and off coupling of the resistor equipment and the driving section. The control method includes executing first braking control targeting the driving section to which the electric power is not supplied, the executing the first braking control calculating speed of the rotation output of the driving section based on an output of the detecting section and causing the switch to turn on and off the coupling of the resistor equipment and the driving section at timing determined in a time-series manner according to target deceleration determined in advance for the driving section and the speed of the rotation output.

(6) In the control method according to the aspect, the robot system may include: a control section configured to control the robot system; and a power storage section functioning as at least a part of the resistor equipment, the power storage section storing the electric power generated by the driving section, and the control method may include the control section receiving supply of the electric power from the power storage section and controlling the robot system when the supply of the electric power to the driving section is interrupted.

(7) In the control method according to the aspect, the one or more combinations may be a plurality of the combinations, the robot system may include a coupling circuit configured to couple a plurality of the driving sections included in the plurality of combinations to one another, and the control method may include: executing the first braking control for the one or more combinations among the plurality of combinations; and executing, for another one or more combinations among the plurality of combinations, second braking control targeting the driving section to which the electric power is supplied, the second braking control controlling, with the coupling circuit, the driving section to generate, using the electric power generated by the first braking control, a rotating force having magnitude corresponding to target deceleration determined in advance for the driving section and in an opposite direction of the rotation output.

The present disclosure can also be realized in various aspects other than the control method for the regenerative brake and the robot system. For example, the present disclosure can be realized in aspects such as a control method for a robot and an operation method for the robot, a computer program for realizing the control method and the operation method, a non-transitory recording medium recording the computer program.

What is claimed is:
1. A robot system comprising:
one or more combinations of:
a driving section configured to receive supply of electric power and generate a rotation output of an output shaft and receive supply of a rotating force to the output shaft and generate electric power;
a movable section moved by the rotation output;
a detecting section configured to detect an angular position of the output shaft;
resistor equipment having electric resistance and coupled to the driving section; and
a switch configured to turn on and off coupling of the resistor equipment and the driving section; and
a control section configured to control the robot system, wherein
the control section executes first braking control targeting the driving section to which the electric power is not supplied, the first braking control calculating speed of the rotation output of the driving section based on an output of the detecting section and causing the switch to turn on and off the coupling of the resistor equipment and the driving section at timing determined in a time-series manner according to target deceleration determined in advance for the driving section and the speed of the rotation output.

2. The robot system according to claim 1, wherein
the robot system comprises, as at least a part of the resistor equipment, a power storage section configured to store electric power generated by the driving section, and
the control section receives supply of the electric power from the power storage section and operates when the supply of the electric power to the driving section is interrupted.

3. The robot system according to claim 2, wherein
the one or more combinations are a plurality of the combinations,
the robot system comprises a coupling circuit configured to couple a plurality of the driving sections included in the plurality of combinations to one another, and
the control section executes the first braking control for the one or more combinations among the plurality of combinations and executes, for another one or more combinations among the plurality of combinations, second braking control targeting the driving section to which the electric power is supplied, the second braking control controlling, with the coupling circuit, the driving section to generate, using the electric power generated by the first braking control, a rotating force having magnitude corresponding to target deceleration determined in advance for the driving section and in an opposite direction of the rotation output.

4. The robot system according to claim 2, further comprising:
a regenerative power circuit configured to supply the electric power generated by the driving section to electronic equipment included in the robot system; and
an equipment protecting section provided in the regenerative power circuit and configured to control a voltage of the electric power supplied to the electronic equipment to a predetermined value or less.

5. The robot system according to claim 3, further comprising:
- a regenerative power circuit configured to supply the electric power generated by the driving section to electronic equipment included in the robot system; and
- an equipment protecting section provided in the regenerative power circuit and configured to control a voltage of the electric power supplied to the electronic equipment to a predetermined value or less.

6. A control method for a regenerative brake in a robot system,
the robot system including:
one or more combinations of:
- a driving section configured to receive supply of electric power and generate a rotation output of an output shaft and receive supply of a rotating force to the output shaft and generate electric power;
- a movable section moved by the rotation output;
- a detecting section configured to detect an angular position of the output shaft;
- resistor equipment having electric resistance and coupled to the driving section; and
- a switch configured to turn on and off coupling of the resistor equipment and the driving section, the control method comprising executing first braking control targeting the driving section to which the electric power is not supplied, the executing the first braking control calculating speed of the rotation output of the driving section based on an output of the detecting section and causing the switch to turn on and off the coupling of the resistor equipment and the driving section at timing determined in a time-series manner according to target deceleration determined in advance for the driving section and the speed of the rotation output.

7. The control method according to claim 6, wherein
the robot system includes:
a control section configured to control the robot system; and
a power storage section functioning as at least a part of the resistor equipment, the power storage section storing the electric power generated by the driving section, and
the control method comprises the control section receiving supply of the electric power from the power storage section and controlling the robot system when the supply of the electric power to the driving section is interrupted.

8. The control method according to claim 7, wherein
the one or more combinations are a plurality of the combinations,
the robot system includes a coupling circuit configured to couple a plurality of the driving sections included in the plurality of combinations to one another, and
the control method comprises:
executing the first braking control for the one or more combinations among the plurality of combinations; and
executing, for another one or more combinations among the plurality of combinations, second braking control targeting the driving section to which the electric power is supplied, the second braking control controlling, with the coupling circuit, the driving section to generate, using the electric power generated by the first braking control, a rotating force having magnitude corresponding to target deceleration determined in advance for the driving section and in an opposite direction of the rotation output.

\* \* \* \* \*